(12) United States Patent
Seong et al.

(10) Patent No.: US 9,023,508 B2
(45) Date of Patent: May 5, 2015

(54) BUS BAR ASSEMBLY OF NOVEL STRUCTURE

(71) Applicant: LG Chem, Ltd., Seoul (KR)

(72) Inventors: Jun Yeob Seong, Daejeon (KR); Bum Hyun Lee, Seoul (KR); Jong Moon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/872,419

(22) Filed: Apr. 29, 2013

(65) Prior Publication Data

US 2013/0236761 A1  Sep. 12, 2013

Related U.S. Application Data

(63) Continuation of application No. PCT/KR2011/008336, filed on Nov. 4, 2011.

(30) Foreign Application Priority Data

Nov. 23, 2010 (KR) .......................... 10-2010-0116713

(51) Int. Cl.
*H01R 25/16* (2006.01)
*H01M 2/10* (2006.01)
(Continued)

(52) U.S. Cl.
CPC ............... *H01R 25/16* (2013.01); *H01M 2/266* (2013.01); *H01M 2/1077* (2013.01); *H01M 2/206* (2013.01); *H01M 2/202* (2013.01); *H01M 2/204* (2013.01)

(58) Field of Classification Search
CPC ...... H01M 2/202; H01M 2/266; H01R 25/16; H01R 25/162
USPC .......................................... 429/159, 158, 160
See application file for complete search history.

(56) References Cited

U.S. PATENT DOCUMENTS

2003/0214631 A1* 11/2003 Svardal et al. ..................... 353/8
2004/0180257 A1*  9/2004 Kimoto ......................... 429/120
(Continued)

FOREIGN PATENT DOCUMENTS

CN  101217190 A  7/2008
CN  101527352 A  9/2009
(Continued)

OTHER PUBLICATIONS

International Search Report issued in PCT/KR2011/008336, mailed on May 29, 2012.

(Continued)

*Primary Examiner* — Jeremiah Smith
(74) *Attorney, Agent, or Firm* — Birch, Stewart, Kolasch & Birch, LLP

(57) ABSTRACT

Disclosed is a bus bar assembly to electrically connect two or more cell module assemblies such that the assemblies are arranged in a lateral direction in a state in which the assemblies are in contact with each other or adjacent to each other to constitute a battery module assembly, the bus bar assembly including (a) a cover plate made of an electrically insulative material, the cover plate being mounted at upper ends of the assemblies, (b) two or more conductive connection parts electrically connected to external input and output terminals of the assemblies in a state in which the conductive connection parts are mounted on the cover plate, and (c) two or more bus bars mounted at the upper end of the cover plate in a direction perpendicular to a direction in which the assemblies are arranged to electrically connect the conductive connection parts of the assemblies to each other.

28 Claims, 11 Drawing Sheets

(51) Int. Cl.
*H01M 2/20* (2006.01)
*H01M 2/26* (2006.01)

(56) References Cited

U.S. PATENT DOCUMENTS

| | | | |
|---|---|---|---|
| 2005/0123828 A1* | 6/2005 | Oogami et al. | 429/152 |
| 2006/0145657 A1* | 7/2006 | Hashida et al. | 320/107 |
| 2006/0246350 A1* | 11/2006 | Takayama et al. | 429/178 |
| 2007/0207377 A1 | 9/2007 | Han et al. | |
| 2009/0226800 A1 | 9/2009 | Ueshima et al. | |
| 2010/0209768 A1* | 8/2010 | Ahn et al. | 429/185 |
| 2011/0008669 A1* | 1/2011 | Ogasawara et al. | 429/160 |

FOREIGN PATENT DOCUMENTS

| | | |
|---|---|---|
| JP | 2002-141036 A | 5/2002 |
| KN | 10-2007-0025391 A | 3/2007 |
| KR | 10-0709263 B1 | 4/2007 |
| KR | 10-2008-0038467 A | 5/2008 |

OTHER PUBLICATIONS

Chinese Office Action and Search Report together with English translation thereof, dated Nov. 4, 2014, issued in Chinese Application No. 201180054049.X.

* cited by examiner

BUS BAR ASSEMBLY OF NOVEL STRUCTURE

CROSS REFERENCE TO RELATED APPLICATIONS

This application is a Continuation of PCT International Application No. PCT/KR2011/008336 filed on Nov. 4, 2011, which claims priority under 35 U.S.C. §119(a) to Patent Application No. 10-2010-0116713 filed in the Republic of Korea on Nov. 23, 2010, all of which are hereby expressly incorporated by reference into the present application.

TECHNICAL FIELD

The present invention relates to a bus bar assembly having a novel structure, and, more particularly, to a bus bar assembly to electrically two or more cell module assemblies such that the cell module assemblies are arranged in a lateral direction in a state in which the cell module assemblies are in tight contact with each other or adjacent to each other to constitute a battery module assembly, the bus bar assembly including (a) a cover plate made of an electrically insulative material, the cover plate being mounted at upper ends of the cell module assemblies, (b) two or more conductive connection parts electrically connected to external input and output terminals of the cell module assemblies in a state in which the conductive connection parts are mounted on the cover plate, and (c) two or more bus bars mounted at the upper end of the cover plate in a direction perpendicular to a direction in which the cell module assemblies are arranged to electrically connect the conductive connection parts of the cell module assemblies to each other.

BACKGROUND ART

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery pack having a plurality of battery cells electrically connected to each other because high power and large capacity are necessary for the middle or large-sized devices.

Preferably, a battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery pack. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

Meanwhile, in order for the battery module to provide power and capacity required by a predetermined apparatus or device, it is necessary to electrically connect a plurality of battery cells in series or in parallel to each other. As the capacity of the battery module is increased, it is necessary for the battery module to have easy expandability and a stable structure. Particularly in a case in which the battery module is configured using a plurality of battery cells or a plurality of cell modules, each of which includes a predetermined number of battery cells, a plurality of members, such as bus bars, for mechanical fastening and electrical connection therebetween is generally needed with the result that a process of assembling the mechanical fastening and electrical connection members is very complicated.

Furthermore, there is needed a space for coupling, welding, or soldering of the mechanical fastening and electrical connection members with the result that the total size of the battery system is increased. The increase in size of the battery system is not preferred in the above regard.

Also, the battery module is constituted by combining a plurality of battery cells, and therefore, safety and operational efficiency of the battery module assembly is greatly lowered when some of the battery cells suffer from overvoltage, overcurrent, or overheating. For this reason, means to sense and control such overvoltage, overcurrent, or overheating are needed. Consequently, voltage sensors are connected to the battery cells to check and control operational states of the battery cells in real time or at predetermined intervals. As the capacity of the battery module is increased, installation or connection of such sensing means very complicate a process of assembling the battery module. Furthermore, a plurality of wires is needed to install or connect the sensing means with the result that a short circuit may occur in the battery module. Also, the secondary battery is used as a power source for vehicles as a result of extension of the application range of the secondary battery. When strong impact or vibration is applied to the battery module, therefore, fastening means to stably maintain contact of the sensing means are needed.

Consequently, there is a high necessity for a bus bar assembly having a novel structure that is capable of fundamentally solving the above-mentioned problems.

DISCLOSURE

Technical Field

Therefore, the present invention has been made to solve the above problems and other technical problems that have yet to be resolved.

Specifically, it is an object of the present invention to provide a bus bar assembly having a specific structure, which is easily expandable, to electrically connect a plurality of cell module assemblies to each other without using a plurality of members for mechanical fastening and electrical connection.

It is another object of the present invention to provide a battery module in which structural stability of cell module assemblies including a bus bar assembly is excellent.

Technical Solution

In accordance with one aspect of the present invention, the above and other objects can be accomplished by the provision of a bus bar assembly to electrically two or more cell module assemblies such that the cell module assemblies are arranged in a lateral direction in a state in which the cell module assemblies are in tight contact with each other or adjacent to each other to constitute a battery module assembly, the bus bar assembly including (a) a cover plate made of an electrically insulative material, the cover plate being mounted at upper ends of the cell module assemblies, (b) two or more conductive connection parts electrically connected to external input and output terminals of the cell module assemblies in a state in which the conductive connection parts are mounted on the cover plate, and (c) two or more bus bars mounted at the upper end of the cover plate in a direction perpendicular to a direction in which the cell module assemblies are arranged to electrically connect the conductive connection parts of the cell module assemblies to each other.

In the bus bar assembly according to the present invention, the bus bars are configured to have a modular assembly structure. Consequently, the bus bar assembly is compact, and the assembly process of the bus bar assembly is simplified. Furthermore, in a case in which additional cell module assemblies are further mounted to increase the capacity of a battery module assembly, it is possible to repetitively couple the same type of bus bar assemblies, thereby improving expandability and maintenance as compared with the structure of a conventional battery module assembly.

In a preferred example, sensing members to measure voltages of the cell module assemblies may be mounted at the upper end of the cover plate such that the sensing members are electrically connected to the conductive connection parts.

The conductive connection parts may include first conductive connection parts electrically connected to the external input and output terminals of the cell module assemblies and the sensing members and second conductive connection parts electrically connected to corresponding ends of the bus bars.

In the above structure, fastening holes, through which the external input and output terminals of the cell module assemblies are inserted and coupled, may be formed in the first conductive connection parts, thereby achieving electrical connection between the external input and output terminals and the conductive connection parts.

Each of the sensing members may include a terminal connection part coupled to an upper end of a corresponding one of the first conductive connection parts to sense voltage of a corresponding one of the cell module assemblies, a connector to transmit the voltage sensed by the terminal connection part to a controller, and a wire to connect the terminal connection part to the connector.

In the above structure, fastening holes, through which the external input and output terminals of the cell module assemblies are inserted and coupled, may also be formed in the terminal connection parts.

The sensing members are connected to the external input and output terminals and conductive connection parts of the bus bars. Consequently, an assembly process is simplified, and the sensing members have a compact structure to stably sense voltage.

Meanwhile, the bus bars and the sensing members are easily mounted to the cover plate.

For example, depressed grooves, in which the conductive connection parts are mounted, may be formed at opposite ends of the cover plate. Consequently, the conductive connection parts do not protrude outward from the cover plate, and therefore, the overall structure of the bus bar assembly is compact.

The cover plate is provided with upwardly protruding fastening members formed at positions corresponding to the bus bars to fix the bus bars. The inside upper end of each of the fastening members may be configured to have an upwardly tapered structure to fixedly fasten the bus bars. Consequently, mechanical coupling of the bus bars to the cover plate is easily achieved.

The cover plate may be provided at a central part thereof with mounting grooves, in which sensing members are mounted, such that the mounting grooves extend in a direction in which the cell module assemblies are arranged.

Preferably, the cover plate is provided at the front and the rear thereof with through holes, through which a supporting bar to support the cell module assemblies is inserted, the through holes protruding upward. In this structure, it is possible to easily mount the cover plate to the upper ends of the cell module assemblies.

The cover plate may be provided at one end of the front thereof with a connection part electrically connected to a neighboring battery module assembly such that the connection part extends downward. As needed, therefore, a plurality of battery module assemblies may be electrically connected to each other to increase capacity. In this case, the battery module assemblies may be connected to have a compact structure.

Opposite ends of each of the bus bars may be bent in a streamlined shape such that the bus bars can be easily inserted from above.

In accordance with another aspect of the present invention, there is provided a battery module assembly having a novel structure including the above bus bar assembly.

Specifically, the battery module assembly according to the present invention may include the bus bar assembly with the above-stated construction, a cell module assembly stack including a plurality of cell module assemblies, each of which is configured to have a structure in which two or more cell modules, each of which includes one or more battery cells mounted in a cell cover, are mounted in a cartridge, the cell module assemblies being arranged in a lateral direction such that the cell module assemblies are in tight contact with each other or adjacent to each other, and a front cover and a rear cover respectively mounted to the front and the rear of the cell module assembly stack.

Preferably, each of the cell modules includes, for example, three battery cells, each of the cell module assemblies includes, for example, three cell modules, and the cell module assembly stack includes, for example, four cell module assemblies.

Also, in the battery module assembly with the above-stated construction, the cell module assembly stack may be supported by the front cover and the rear cover. Consequently, it is possible to effectively prevent damage to the cell module assembly stack due to external force or vibration, thereby securing overall structural stability of the battery module assembly.

The front cover and the rear cover each may be provided at the upper end thereof with a first through hole, through which an upper supporting bar to support the upper part of the cell module assembly stack is inserted and coupled. Consequently, the upper supporting bar is easily inserted through the first through holes of the front cover and the rear cover, thereby easily achieving connection between the front cover and the rear cover via the upper supporting bar.

The front cover and the rear cover each may be provided at the lower end thereof with a pair of second through holes, through which a pair of lower supporting bars to support the lower part of the cell module assembly stack is inserted and coupled. Consequently, the lower supporting bars are easily inserted through the second through holes of the front cover and the rear cover, thereby easily achieving connection between the front cover and the rear cover via the lower supporting bars.

In a preferred example, each of the cell module assemblies may include a cell module stack including two or more cell modules, each of which has cell modules mounted in a cartridge, are stacked in a state in which the cell modules are in tight contact with each other or adjacent to each other, a lower end plate to support the lower end of the cell module stack, and an upper end plate to fix the uppermost cartridge of the cell module stack disposed on the lower end plate. Through holes may be formed in the cartridges, the upper end plate, and the lower end plate such that the through holes communicate with each other, hollow fixing members to decide fastening height may be inserted through the through holes, and coupling members may be inserted through the fixing members to fasten the cartridges, the upper end plate, and the lower end plate.

Each of the fixing members may be configured to have a polygonal or circular hollow structure in vertical section, and the inside shape of each of the through holes may correspond to the outside shape of a corresponding one of the fixing members. Consequently, the fixing members can be easily inserted through the through holes.

The height of each of the fixing members may correspond to the coupling height of the cartridges, the upper end plate, and the lower end plate. Each of the fixing members may be made of a metallic material.

The upper end of each of the coupling members may have an outer circumferential part larger than that of the upper end of a corresponding one of the fixing members to position the upper end plate, and the lower end of each of the coupling members may have an outer circumferential part larger than that of the lower end of a corresponding one of the fixing members to position the lower end plate.

The coupling members are not particularly restricted so long as the coupling members can be easily coupled to the fixing members. For example, the coupling members may be fastening bolts.

In the above structure, each of the coupling members may further include a fastening nut coupled to the lower end of a corresponding one of the fastening bolts. The upper end plate and the lower end plate may be made of a metallic material.

The upper end plate and the lower end plate each may be provided at a central part thereof with a heat insulation member to prevent introduction of radiant heat into the battery cells.

Meanwhile, the cell modules may be connected in parallel to each other by bus bars.

In a preferred example, each of the bus bars may include (a) two or more cell module terminal connection parts, each of which includes a vertical bent side contacting one side of an electrode terminal of each of the cell modules, and (b) an external input and output terminal connection part, to which the cell module terminal connection parts are integrally connected.

Bodies of the cell module terminal connection parts and the external input and output terminal connection part may be configured in the shape of a sheet such that the bodies of the cell module terminal connection parts and the external input and output terminal connection part can be mounted to one side of the cell module stack.

The external input and output terminal connection part may be provided with a fastening through hole, through which an external input and output terminal is inserted and coupled. Consequently, the external input and output terminal can be easily inserted into the external input and output terminal connection part through the fastening through hole.

The cell module stack may be configured to have a structure in which the cell modules are stacked such that a cathode terminal and an anode terminal of each of the cell modules are located at one end of the cell module stack.

In the above structure, the cell module stack is preferably configured to have a structure in which a cathode terminal bus bar to connect the cathode terminals of the cell modules in parallel to each other and an anode terminal bus bar to connect the anode terminals of the cell modules in parallel to each other are mounted to the cell module stack, and the bus bars are mounted to an electrically insulative member ('insulative mounting member') in a state in which the bus bars are spaced apart from each other.

The bus bars may be integrally mounted to the insulative mounting member by insert injection molding such that the vertical bent sides of the cell module terminal connection parts and the external input and output terminal connection parts are exposed upward. This structure is preferable since the coupling between the bus bars and the insulative mounting member without the necessity of an additional assembly process.

In a preferred example, a mounting groove, in which a supporting bar is mounted, may be formed at the insulative mounting member between the anode terminal bus bar and the cathode terminal bus bar.

Each of the battery cells may be a pouch-shaped battery cell having an electrode assembly mounted in a case made of a laminate sheet including a resin layer and a metal layer. Preferably, each of the battery cells is a pouch-shaped lithium secondary battery.

In accordance with a further aspect of the present invention, there is provided a high-power, large-capacity battery pack manufactured using the battery module assembly with the above-stated construction as a unit body.

The battery pack according to the present invention generally has a compact structure, and structurally stable mechanical fastening and electrical connection are achieved without using a large number of members. Also, a predetermined number, such as 4, 6, 8, or 10, of cell module assemblies may constitute a battery pack, and therefore, it is possible to effectively mount a necessary number of battery packs in a limited space.

The battery pack according to the present invention may be manufactured by combining battery module assemblies based on desired power and capacity. In consideration of installation efficiency and structural stability as previously described, the battery pack according to the present invention is preferably used as a power source for electric vehicles, hybrid electric vehicles, plug-in hybrid electric vehicles, or power storage devices. However, the application range of the battery pack is not limited thereto.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
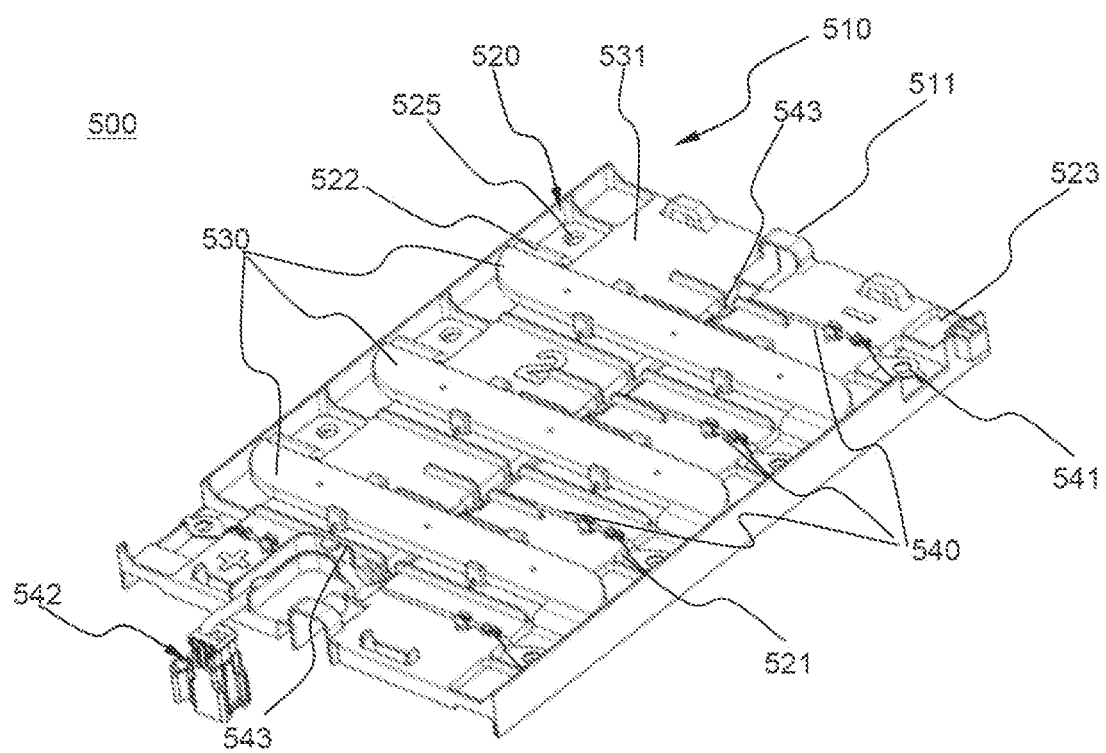
FIG. 1 is a perspective view showing a bus bar assembly according to an embodiment of the present invention.
Figure 2:
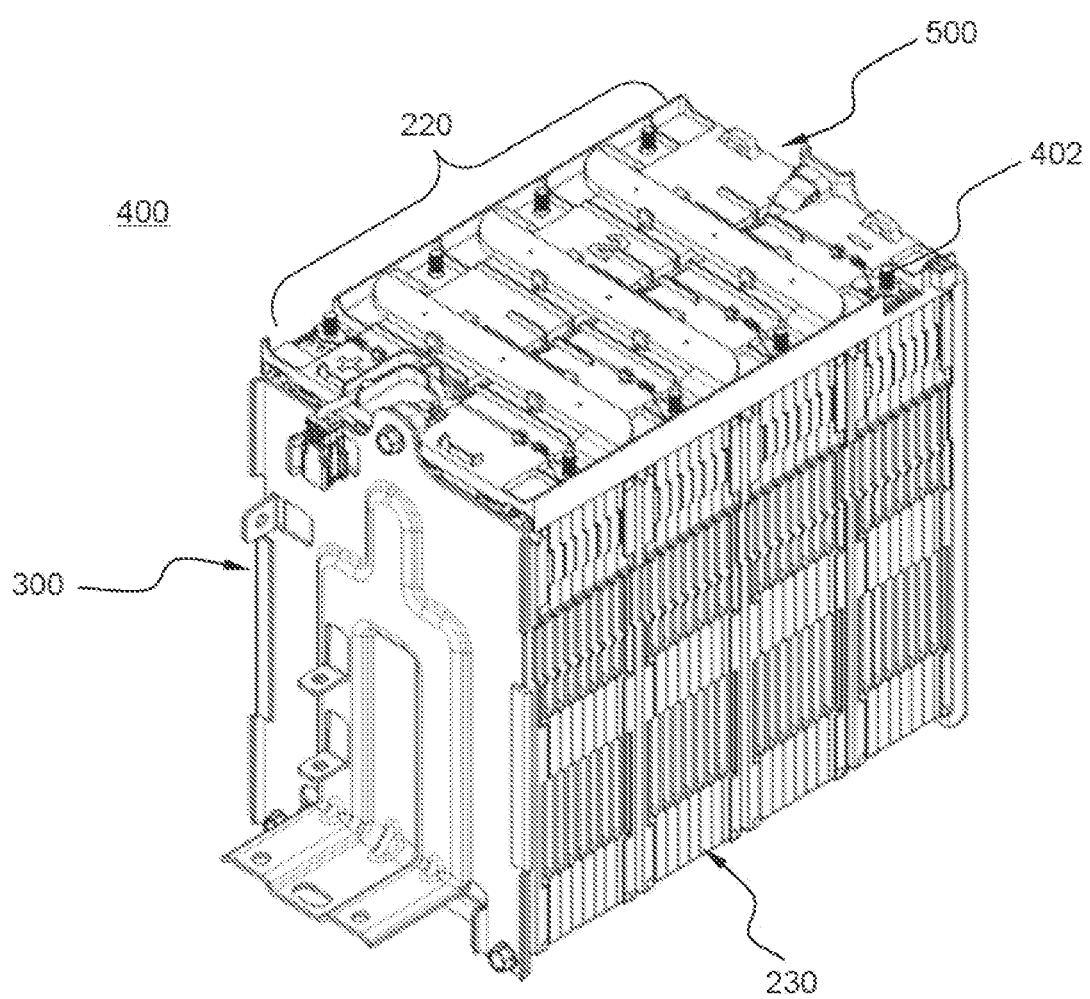
FIG. 2 is a perspective view showing a structure in which the bus bar assembly of FIG. 1 is mounted to battery modules.

FIG. 1 is a perspective view typically showing a bus bar assembly according to an embodiment of the present invention, and FIG. 2 is a perspective view typically showing a structure in which the bus bar assembly of FIG. 1 is mounted to a battery module assembly.

Referring to these drawings, a bus bar assembly 500 to electrically connect battery modules 400 in series to each other is mounted at the upper ends of cell module assemblies 230.

The bus bar assembly 500 includes a cover plate 510, made of an electrically insulative material, mounted to the upper ends of the cell module assemblies 230, six conductive connection parts 520, and three bus bars 530.

Also, the conductive connection parts 520 are electrically connected to external input and output terminals 402 of the cell module assemblies 230 in a state in which the conductive connection parts 520 are mounted on the cover plate 510. The bus bars 530 are mounted at the upper end of the cover plate 510 in a direction perpendicular to the direction in which the cell module assemblies 230 are arranged to electrically connect the conductive connection parts 520 of the cell module assemblies 230 to each other.

Sensing members 540 to measure voltages of the cell module assemblies 230 are mounted at the upper end of the cover plate 510 such that the sensing members 540 are electrically connected to the conductive connection parts 520. The conductive connection parts 520 include first conductive connection parts 521 electrically connected to the external input and output terminals 402 of the cell module assemblies 230 and the sensing members 540 and second conductive connection parts 522 electrically connected to corresponding ends of the bus bars 530.

Also, fastening holes 525, through which the external input and output terminals 402 of the cell module assemblies 230 are inserted and coupled, are formed in the first conductive connection parts 521.

Each of the sensing members 540 includes a terminal connection part 541 coupled to the upper end of a corresponding one of the first conductive connection parts 521 to sense voltage of a corresponding one of the cell module assemblies 230, a connector 542 to transmit the voltage sensed by the terminal connection part 541 to a controller (not shown), and a wire 543 to connect the terminal connection part 541 to the connector 542.

Fastening holes 525, through which the external input and output terminals 402 of the cell module assemblies 230 are inserted and coupled, are formed in the respective terminal connection parts 541.

Also, depressed grooves 523, in which the conductive connection parts 521 are mounted, are formed at opposite ends of the cover plate 510.

The cover plate 510 is provided with upwardly protruding fastening members 531 which are formed at positions corresponding to the bus bars 530 to fix the bus bars 530. The inside upper end of each of the fastening members 531 is configured to have an upwardly tapered structure to fixedly fasten the bus bars 530.

The cover plate 510 is provided at a central part thereof with mounting grooves 543, in which the sensing members 540 are mounted. The mounting grooves 543 extend in the direction in which the cell module assemblies 230 are arranged.

Meanwhile, the cover plate 510 is provided at the front and the rear thereof with through holes 511, through which a supporting bar 330 to support the cell module assemblies 230 is inserted. The through holes 511 protrude upward.

Also, the cover plate 510 is provided at one end of the front thereof with a connection part 512 electrically connected to a neighboring battery module assembly (not shown). The connection part 512 extends downward.

Meanwhile, opposite ends of each of the bus bars 530 are bent in a streamlined shape such that the bus bars 530 can be easily inserted from above.

Figure 3:
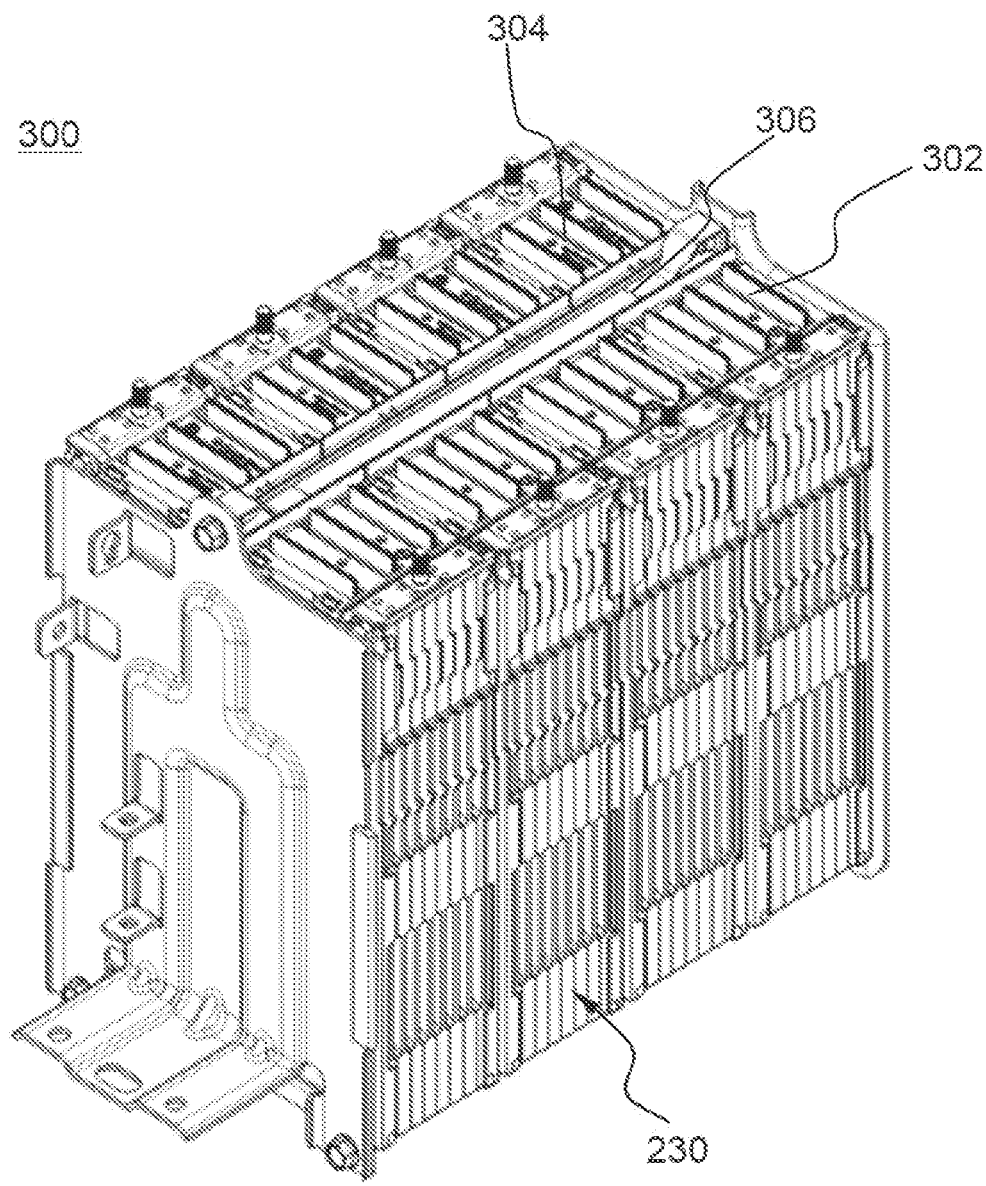
FIG. 3 is a perspective view showing a battery module assembly of FIG. 2.
Figure 4:
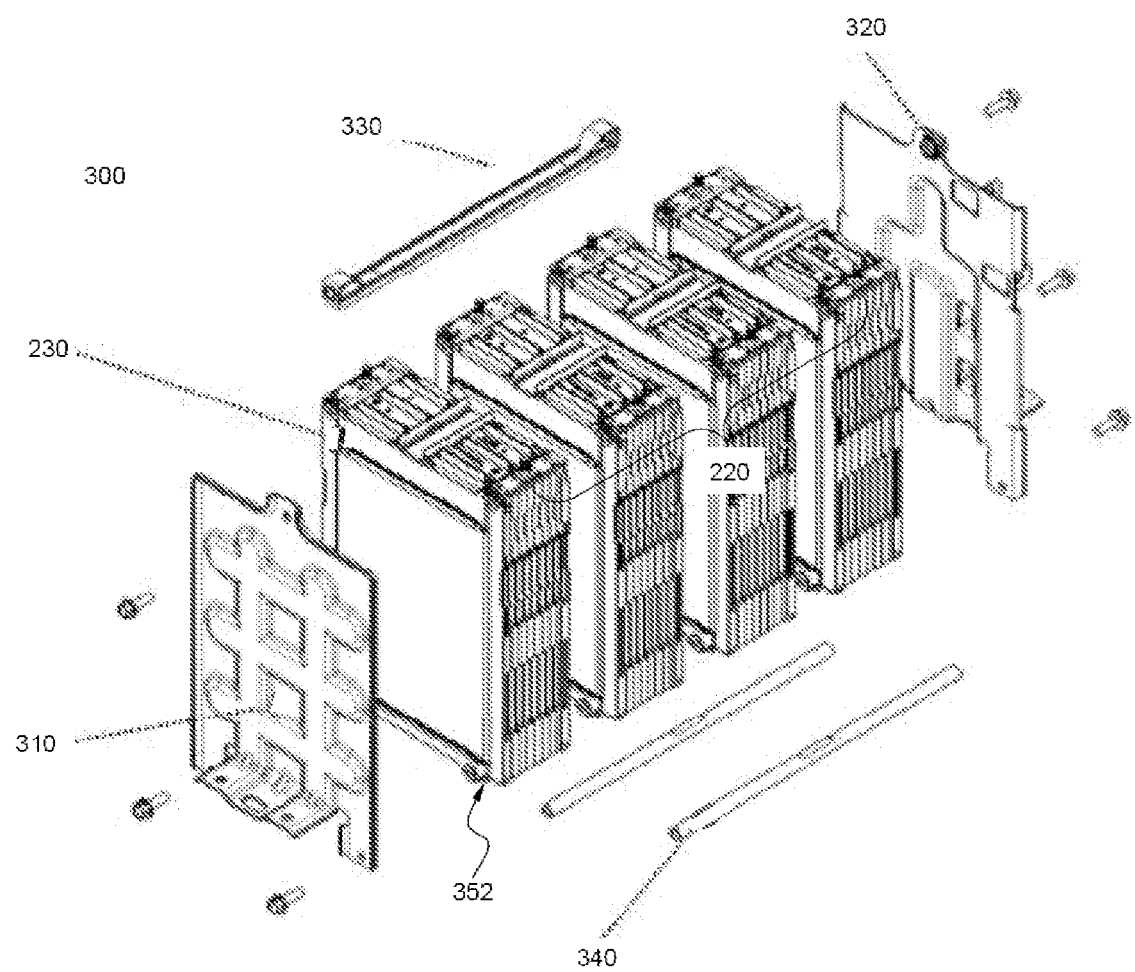
FIG. 4 is an exploded perspective view showing the battery module assembly of FIG. 3.
Figure 5:
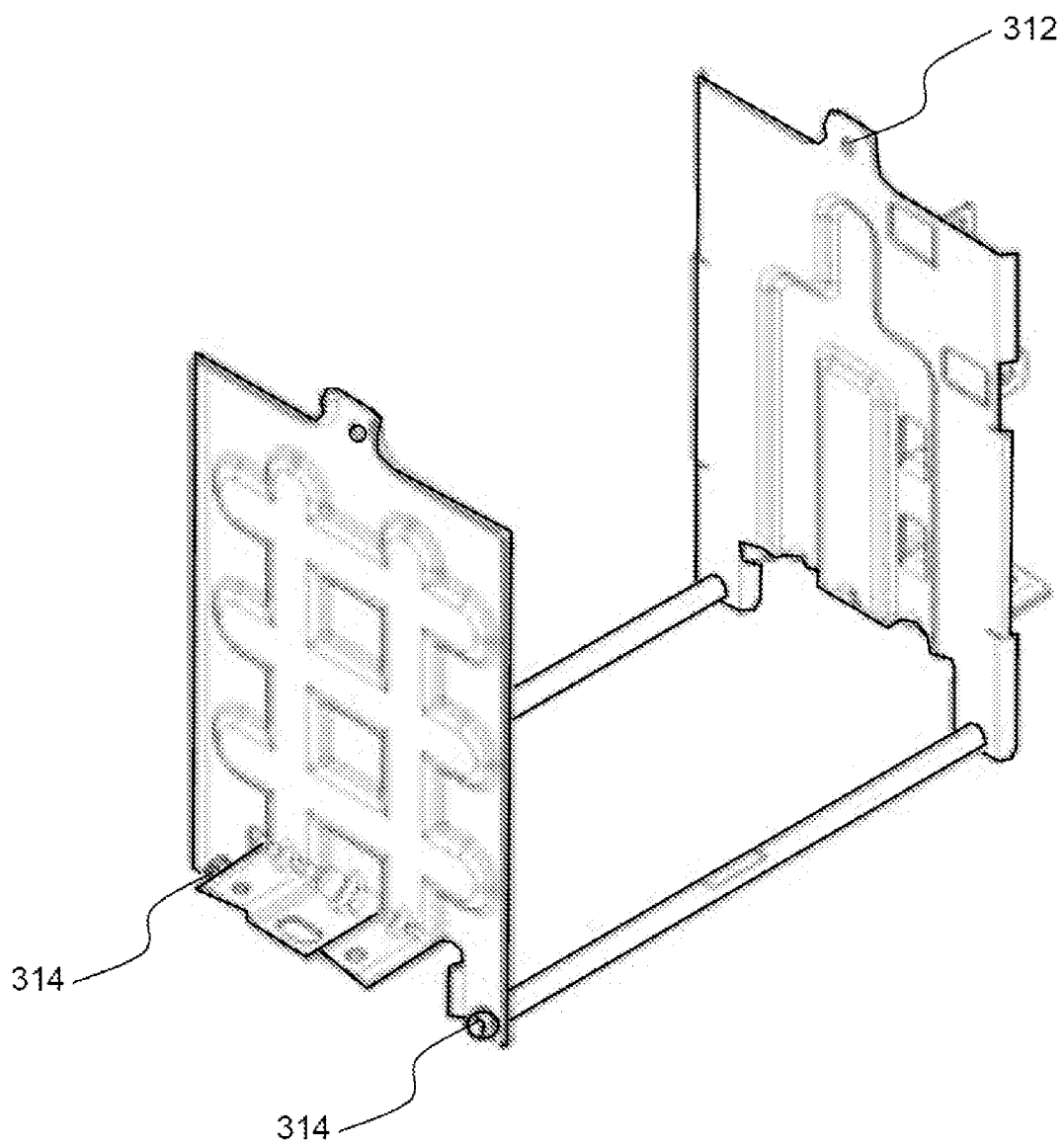
FIGS. 5 and 6 are perspective views showing a process in which cell module assemblies are mounted to lower supporting bars of FIG. 3.
Figure 6:
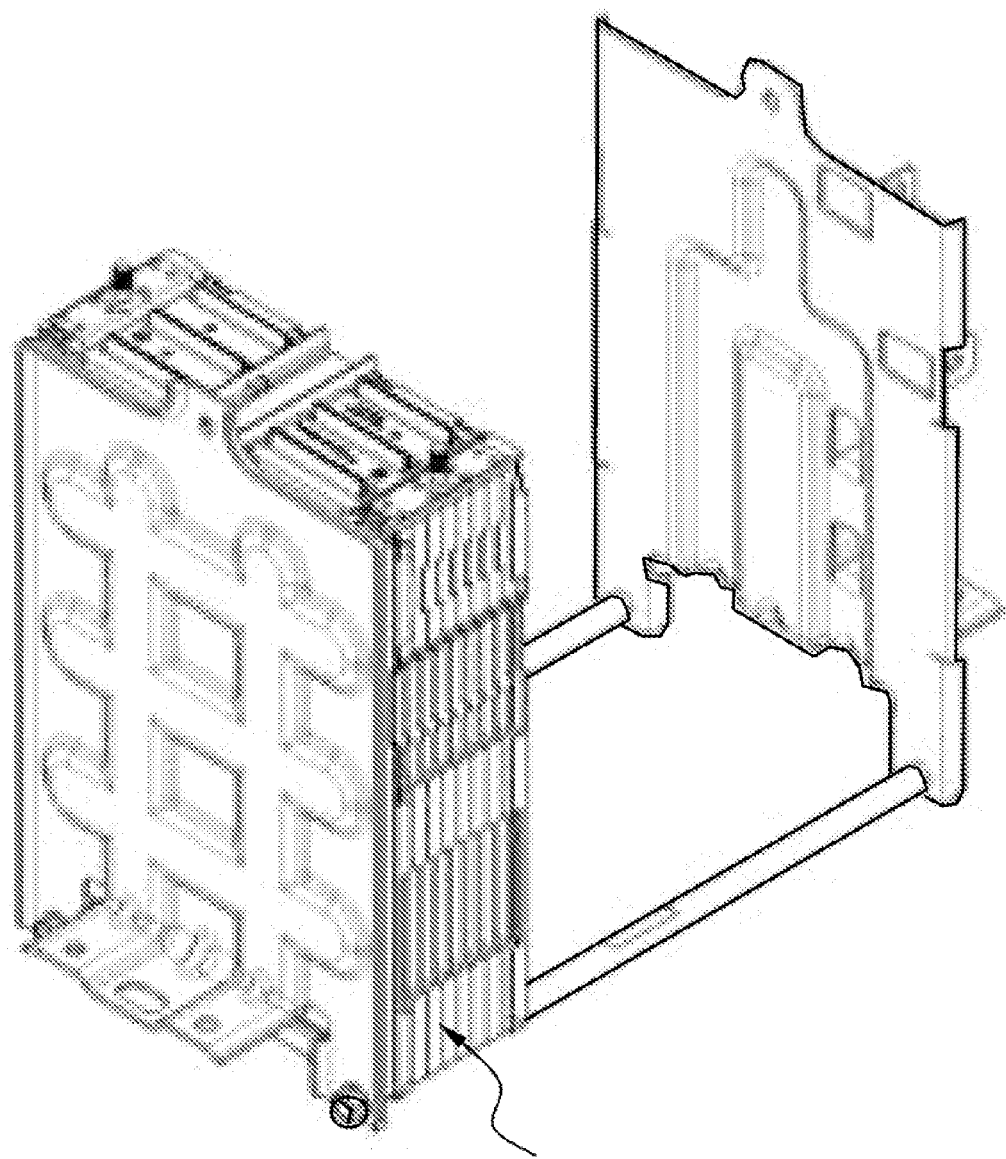

FIG. 3 is a perspective view typically showing the battery module assembly of FIG. 2, FIG. 4 is an exploded perspective view typically showing the battery module assembly of FIG. 3, and FIGS. 5 and 6 are perspective views showing a process in which the cell module assemblies are mounted to lower supporting bars of FIG. 3.

Referring to these drawings together with FIG. 2, the battery module assembly 300 includes a plurality of cell module assemblies 230, a front cover 310 and a rear cover 320, an upper supporting bar 330, and a pair of lower supporting bars 340.

A cell module assembly stack 220 includes four cell module assemblies 230, each of which is configured to have a structure in which a plurality of cell modules, each of which includes three battery cells, is mounted in a cartridge 350 in a state in which the cell modules are connected in series and/or in parallel to each other. The cell module assemblies 230 are arranged in a lateral direction such that the cell module assemblies 230 are electrically connected to each other in a state in which the cell module assemblies 230 are in tight contact with each other.

The front cover 310 and the rear cover 320 cover the front and the rear of the outermost cell module assemblies of the cell module assembly stack 220. The upper supporting bar 330 connects the front cover 310 and the rear cover 320 to each other at the upper end of the cell module assembly stack 220 to support the upper part of the cell module assembly stack 220.

Also, the lower supporting bars 340 connect the front cover 310 and the rear cover 320 to each other at the lower end of the cell module assembly stack 220 to support the lower part of the cell module assembly stack 220.

At the upper end of the front cover 310 is formed a first through hole 312, through which the upper supporting bar 330 is inserted and coupled. At the upper end of the rear cover 320 is also formed another first through hole 312, through which the upper supporting bar 330 is inserted and coupled. At opposite sides of the lower end of the front cover 310 is formed a pair of second through holes 314, through which the lower supporting bars 340 are inserted and coupled. At opposite sides of the lower end of the rear cover 320 is also formed another pair of second through holes 314, through which the lower supporting bars 340 are inserted and coupled.

Figure 7:
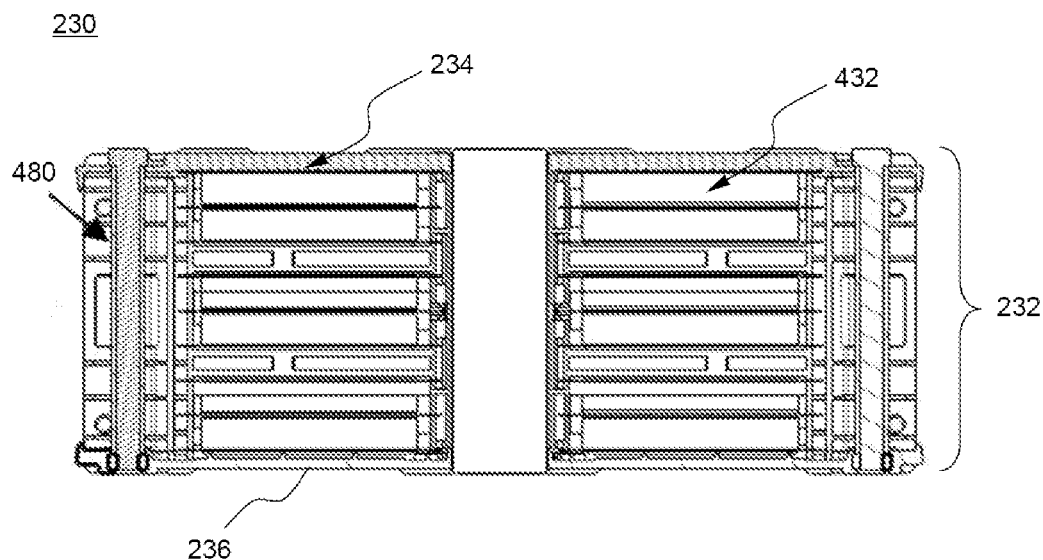
FIG. 7 is a plan view typically showing a battery module of FIG. 3.
Figure 8:
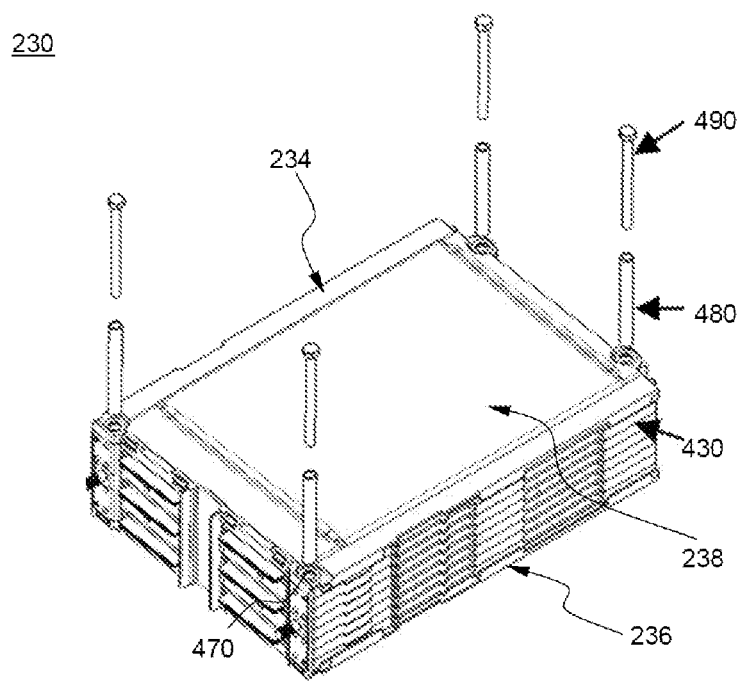
FIG. 8 is a perspective view showing a process of fastening fixing members and coupling members used to manufacture the battery module of FIG. 7.
Figure 9:
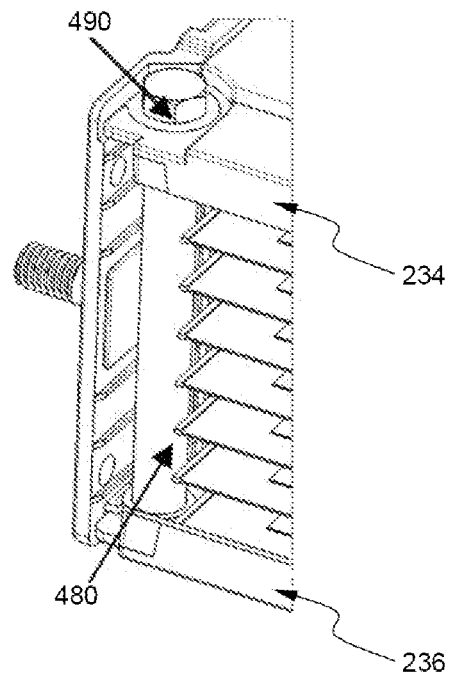
FIG. 9 is a partially enlarged perspective view of FIG. 7.

FIG. 7 is a sectional view typically showing cell modules constituting each of the cell module assemblies of FIG. 3, and FIG. 8 is a perspective view showing a process of fastening fixing members and coupling members used to manufacture the cell modules of FIG. 7. Also, FIG. 9 is a partially enlarged perspective view of FIG. 7.

Referring to these drawings, a cell module assembly 230 includes a cell module stack 232, a lower end plate 236, and an upper end plate 234.

The cell module stack 232 includes three cell modules which are stacked in a state in which the cell modules are in tight contact with each other. The lower end plate 236 supports the lower end of the cell module stack 232.

Also, the upper end plate 234 fixes the uppermost cartridge (not shown) of the cell module stack 232 disposed on the lower end plate 236.

The cartridges (not shown), the upper end plate 234, and the lower end plate 236 are provided at four corners thereof with through holes 470. The through holes 470 of the cartridges, the upper end plate 234, and the lower end plate 236 communicate with each other. Through the through holes 470 are inserted hollow fixing members 480 to decide fastening height. Through the fixing members 480 are inserted coupling members 490 to fasten the cartridges, the upper end plate 234, and the lower end plate 236.

Each of the fixing members 480 is configured to have a circular hollow structure in vertical section. The inside shape of each of the through holes 470 corresponds to the outside shape of a corresponding one of the fixing members 480. Also, the height of each of the fixing members 480 corresponds to the coupling height of the cartridges, the upper end plate 234, and the lower end plate 236. Each of the fixing members 480 is made of a metallic material.

The outer circumferential part of the upper end of each of the coupling members 490, which are fastening bolts, is larger than that of the upper end of a corresponding one of the fixing members 480 to position the upper end plate 234, and the outer circumferential part of the lower end of each of the coupling members 490 is larger than that of the lower end of a corresponding one of the fixing members 480 to position the lower end plate 236.

Also, each of the coupling members 490 includes a fastening nut (not show) coupled to the lower end of a corresponding one of the fastening bolts. The upper end plate 234 and the lower end plate 236 are made of a metallic material.

The upper end plate 234 and the lower end plate 236 each are provided at a central part thereof with a heat insulation member 238 to prevent introduction of radiant heat into the battery cells. Cell modules 430 are electrically connected in parallel to each other by bus bars 432.

Figure 10:
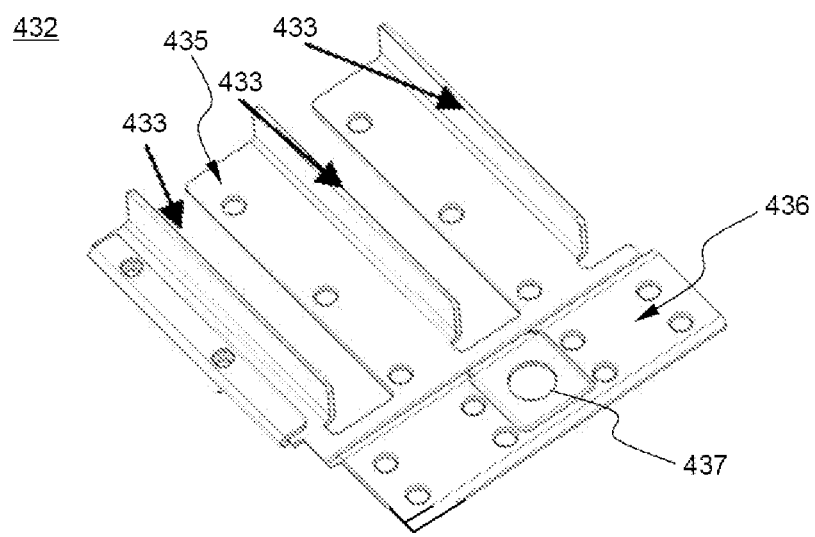
FIG. 10 is a perspective view showing a bus bar according to another embodiment of the present invention.
Figure 11:
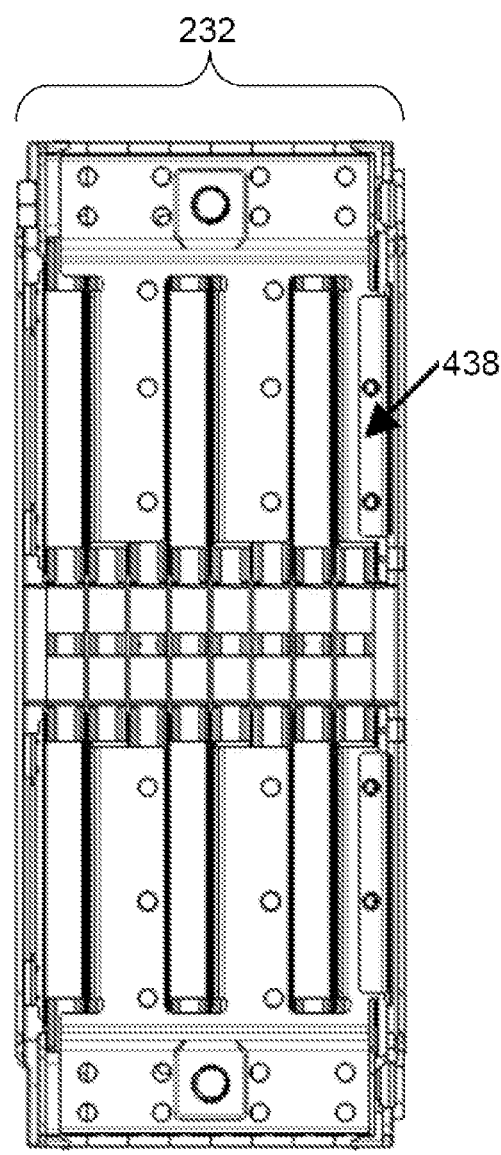
FIGS. 11 and 12 are a plan view and a perspective view respectively showing a coupled state between the bus bar and an insulative mounting member.
Figure 12:
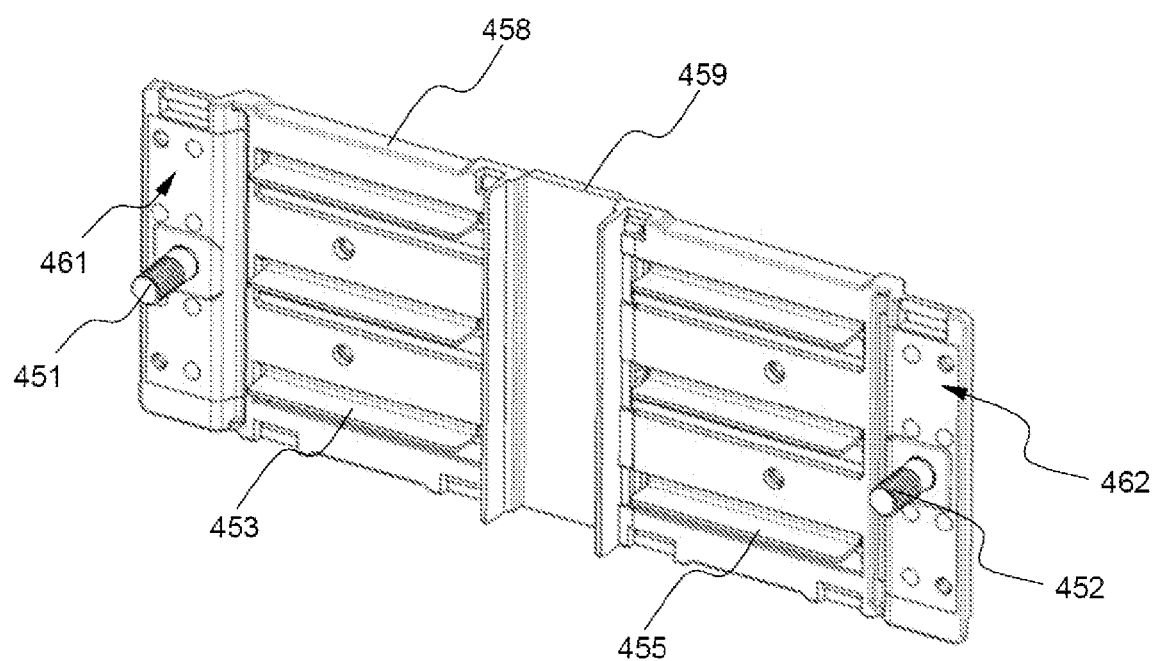

FIG. 10 is a perspective view typically showing a bus bar according to another embodiment of the present invention, and FIGS. 11 and 12 are a plan view and a perspective view respectively showing a coupled state between the bus bar and an insulative mounting member.

Figure 13:
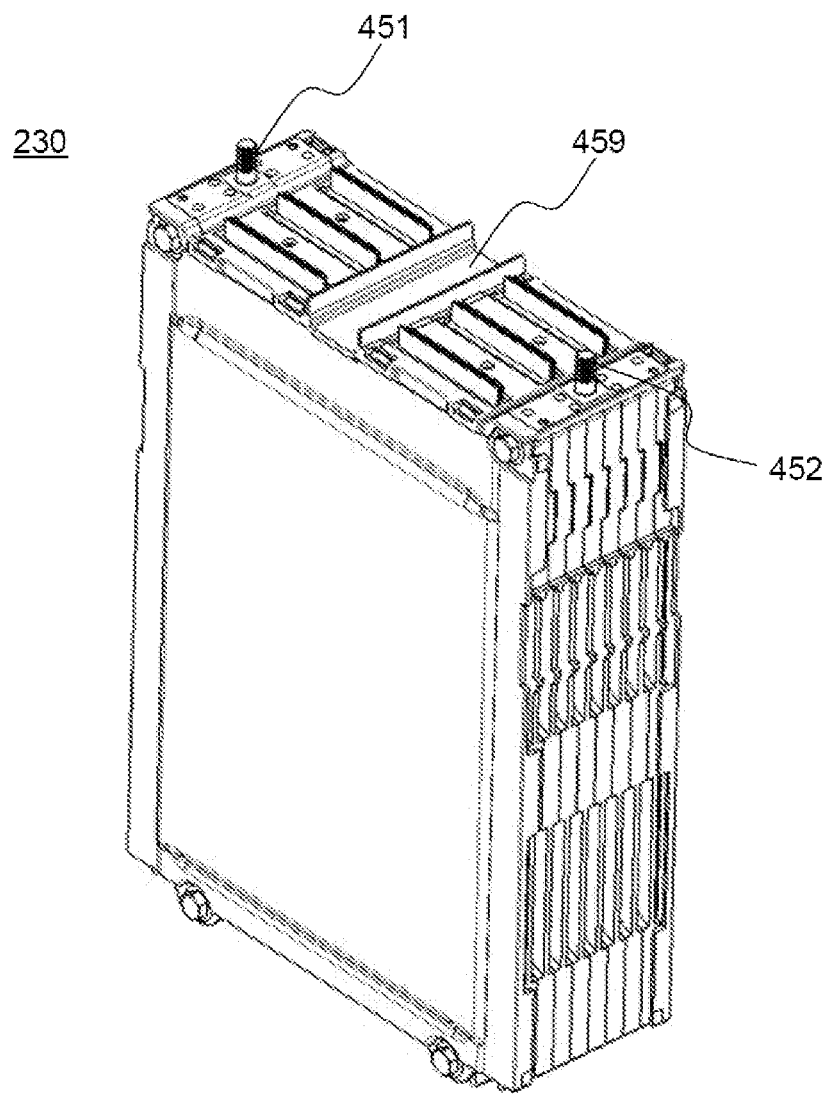
FIG. 13 is a perspective view showing a cell module assembly of FIG. 3.

Also, FIG. 13 is a perspective view typically showing one of the cell module assemblies of FIG. 3.

Referring to these drawings together with FIG. 8, a bus bar 432 includes three cell module terminal connection parts 433, each of which includes a vertical bent side contacting one side of an electrode terminal of each cell module 430, and an external input and output terminal connection part 436, to which the cell module terminal connection parts 433 are integrally connected.

Bodies of the cell module terminal connection parts 433 and the external input and output terminal connection part 436 are configured in the shape of a sheet such that the bus bar can be mounted to one side of the cell module stack 232. In the external input and output terminal connection part 436 is formed a fastening through hole 437, through which external input and output terminals 451 and 452 are inserted.

The cell module stack 232 is configured to have a structure in which the cell modules 430 are stacked such that a cathode terminal 453 and an anode terminal 455 of each of the cell modules 430 are located at one end of the cell module stack 232.

Also, a cathode terminal bus bar 461 to connect the cathode terminals 453 of the unit modules in parallel to each other and an anode terminal bus bar 462 to connect the anode terminals 455 of the unit modules in parallel to each other are mounted to the cell module stack 232. The bus bars 461 and 462 are mounted to an insulative mounting member 458 in a state in which the bus bars 461 and 462 are spaced apart from each other.

The bus bars 461 and 462 are integrally mounted to the insulative mounting member 458 by insert injection molding such that the vertical bent sides of the cell module terminal connection parts 433 and the external input and output terminal connection parts 436 are exposed upward. A mounting groove 459, in which the upper supporting bar is mounted, is formed at the insulative mounting member 458 between the anode terminal bus bar 462 and the cathode terminal bus bar 461.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a bus bar assembly according to the present invention includes bus bars and sensing members disposed on a cover plate. Consequently, it is possible to improve expandability and maintenance of a cell module assembly while configuring the cell module assembly to have a compact structure.

The invention claimed is:

1. A battery module assembly comprising:
a bus bar assembly to electrically connect two or more cell module assemblies such that the cell module assemblies are arranged in a lateral direction in a state in which the cell module assemblies are in tight contact with each other or adjacent to each other to constitute a battery module assembly, the bus bar assembly comprising:
(a) a cover plate made of an electrically insulative material, the cover plate being mounted at upper ends of the cell module assemblies;
(b) two or more conductive connection parts electrically connected to external input and output terminals of the cell module assemblies in a state in which the conductive connection parts are mounted on the cover plate; and
(c) two or more bus bars mounted at an upper end of the cover plate in a direction perpendicular to a direction in which the cell module assemblies are arranged to electrically connect the conductive connection parts of the cell module assemblies to each other;
a cell module assembly stack comprising the two or more cell module assemblies, each of which is configured to have a structure in which two or more cell modules, each of which comprises one or more battery cells mounted in a cell cover, are mounted in cartridges; and
a front cover and a rear cover respectively mounted to a front and a rear of the cell module assembly stack, wherein each of the cell module assemblies comprises:
- a cell module stack comprising two or more cell modules, each of which has the one or more battery cells mounted in the cell cover, are stacked in a state in which the cell modules are in tight contact with each other or adjacent to each other, each cell module being located in a corresponding cartridge;
- a lower end plate to support a lower end of the cell module stack; and
- an upper end plate to fix an uppermost cartridge of the cell module stack disposed on the lower end plate, wherein through holes are formed in the cartridges, the upper end plate, and the lower end plate such that the through holes communicate with each other, wherein hollow fixing members to decide fastening height are inserted through the through holes, and wherein coupling members are inserted through the fixing members to fasten the cartridges, the upper end plate, and the lower end plate, wherein the cell modules are connected in parallel to each other by bus bars, and wherein each of the bus bars comprises:
- (a) two or more cell module terminal connection parts, each of which comprises a vertical bent side contacting one side of an electrode terminal of each of the cell modules; and
- (b) an external input and output terminal connection part, to which the cell module terminal connection parts are integrally connected.

2. The battery module assembly according to claim 1, wherein sensing members to measure voltages of the cell module assemblies are mounted at the upper end of the cover plate such that the sensing members are electrically connected to the conductive connection parts.

3. The battery module assembly according to claim 2, wherein the conductive connection parts comprise first conductive connection parts electrically connected to the external input and output terminals of the cell module assemblies and the sensing members and second conductive connection parts electrically connected to corresponding ends of the bus bars.

4. The battery module assembly according to claim 3, wherein fastening holes, through which the external input and output terminals of the cell module assemblies are inserted and coupled, are formed in the first conductive connection parts.

5. The battery module assembly according to claim 3, wherein each of the sensing members comprises a terminal connection part coupled to an upper end of a corresponding one of the first conductive connection parts to sense voltage of a corresponding one of the cell module assemblies, a connector to transmit the voltage sensed by the terminal connection part to a controller, and a wire to connect the terminal connection part to the connector.

6. The battery module assembly according to claim 5, wherein fastening holes, through which the external input and output terminals of the cell module assemblies are inserted and coupled, are formed in the terminal connection parts.

7. The battery module assembly according to claim 1, wherein depressed grooves, in which the conductive connection parts are mounted, are formed at opposite ends of the cover plate.

8. The battery module assembly according to claim 1, wherein the cover plate is provided with upwardly protruding fastening members formed at positions corresponding to the bus bars to fix the bus bars.

9. The battery module assembly according to claim 1, wherein the cover plate is provided at a central part thereof with mounting grooves, in which sensing members are mounted, such that the mounting grooves extend in a direction in which the cell module assemblies are arranged.

10. The battery module assembly according to claim 1, wherein the cover plate is provided at a front and a rear thereof with through holes, through which a supporting bar to support the cell module assemblies is inserted, such that the through holes protrude upward.

11. The battery module assembly according to claim 1, wherein the cover plate is provided at one end of a front thereof with a connection part electrically connected to a neighboring battery module assembly such that the connection part extends downward.

12. The battery module assembly according to claim 1, wherein opposite ends of each of the bus bars are bent in a streamlined shape such that the bus bars are easily inserted from above.

13. The battery module assembly according to claim 1, wherein the front cover and the rear cover each are provided at an upper end thereof with a first through hole, through which an upper supporting bar to support an upper part of the cell module assembly stack is inserted and coupled.

14. The battery module assembly according to claim 1, wherein the front cover and the rear cover each are provided at a lower end thereof with a pair of second through holes, through which a pair of lower supporting bars to support a lower part of the cell module assembly stack is inserted and coupled.

15. The battery module assembly according to claim 1, wherein each of the fixing members is configured to have a polygonal or circular hollow structure in vertical section, and an inside shape of each of the through holes corresponds to an outside shape of a corresponding one of the fixing members.

16. The battery module assembly according to claim 1, wherein a height of each of the fixing members corresponds to a coupling height of the cartridges, the upper end plate, and the lower end plate.

17. The battery module assembly according to claim 1, wherein an upper end of each of the coupling members has an outer circumferential part larger than that of an upper end of a corresponding one of the fixing members to position the upper end plate, and a lower end of each of the coupling members has an outer circumferential part larger than that of a lower end of a corresponding one of the fixing members to position the lower end plate.

18. The battery module assembly according to claim 1, wherein the coupling members are fastening bolts.

19. The battery module assembly according to claim 1, wherein the upper end plate and the lower end plate each are provided at a central part thereof with a heat insulation member to prevent introduction of radiant heat into the battery cells.

20. The battery module assembly according to claim 1, wherein bodies of the cell module terminal connection parts and the external input and output terminal connection part are configured in the shape of a sheet such that the bodies of the cell module terminal connection parts and the external input and output terminal connection part are mounted to one side of the cell module stack.

21. The battery module assembly according to claim 1, wherein the external input and output terminal connection part is provided with a fastening through hole, through which an external input and output terminal is inserted and coupled.

22. The battery module assembly according to claim 1, wherein the cell module stack is configured to have a structure in which the cell modules are stacked such that a cathode terminal and an anode terminal of each of the cell modules are located at one end of the cell module stack.

23. The battery module assembly according to claim 22, wherein a cathode terminal bus bar to connect the cathode terminals of the cell modules in parallel to each other and an anode terminal bus bar to connect the anode terminals of the cell modules in parallel to each other are mounted to the cell module stack, and the bus bars are mounted to an electrically insulative member in a state in which the bus bars are spaced apart from each other.

24. The battery module assembly according to claim 23, wherein the electrically insulative member is an insulative mounting member and the bus bars are integrally mounted to the insulative mounting member by insert injection molding such that the vertical bent sides of the cell module terminal connection parts and the external input and output terminal connection parts are exposed upward.

25. The battery module assembly according to claim 23, wherein the electrically insulative member is an insulative mounting member and a mounting groove, in which a supporting bar is mounted, is formed at the insulative mounting member between the anode terminal bus bar and the cathode terminal bus bar.

26. The battery module assembly according to claim 1, wherein each of the battery cells is a pouch-shaped battery cell having an electrode assembly mounted in a case made of a laminate sheet comprising a resin layer and a metal layer.

27. A battery pack manufactured using a battery module assembly according to claim 1 as a unit body.

28. The battery pack according to claim 27, wherein the battery pack is used as a power source for electric vehicles, hybrid electric vehicles, plug-in hybrid electric vehicles, or power storage devices.

* * * * *